US009987194B2

(12) United States Patent
Havel et al.

(10) Patent No.: US 9,987,194 B2
(45) Date of Patent: Jun. 5, 2018

(54) MULTI-CELL SEALED CONTAINER

(71) Applicant: Muffin Incorporated, West Lafayette, IN (US)

(72) Inventors: William J. Havel, West Lafayette, IN (US); Neal E. Fearnot, West Lafayette, IN (US); Peter S. McKinnis, West Lafayette, IN (US); Richard B. Sisken, West Lafayette, IN (US); Charles Leland Baxter, West Lafayette, IN (US)

(73) Assignee: Muffin Incorporated, West Lafayette, IN (US)

( * ) Notice: Subject to any disclaimer, the term of this patent is extended or adjusted under 35 U.S.C. 154(b) by 0 days. days.

(21) Appl. No.: 14/835,757

(22) Filed: Aug. 26, 2015

(65) Prior Publication Data

US 2016/0058664 A1 Mar. 3, 2016

Related U.S. Application Data

(60) Provisional application No. 62/041,820, filed on Aug. 26, 2014.

(51) Int. Cl.
*B65D 75/42* (2006.01)
*B65D 75/44* (2006.01)
(Continued)

(52) U.S. Cl.
CPC .............. *A61J 1/1406* (2013.01); *A61J 1/10* (2013.01); *A61J 1/1468* (2015.05); *A61J 1/2093* (2013.01); *B29C 65/02* (2013.01); *B29C 66/1122* (2013.01); *B29C 66/344* (2013.01); *B29C 66/43121* (2013.01); *B29C 66/73921* (2013.01); *B31B 70/00* (2017.08); *B65B 51/26* (2013.01); *B65D 75/42* (2013.01); *B65D 75/44* (2013.01); *B29C 65/04* (2013.01); *B29C 65/08* (2013.01);
(Continued)

(58) Field of Classification Search
None
See application file for complete search history.

(56) References Cited

U.S. PATENT DOCUMENTS 3,415,363 A 12/1968 Horeth et al.
3,500,830 A 3/1970 Van Eck
(Continued)

FOREIGN PATENT DOCUMENTS

EP 1 693 044 A1 8/2006
EP 2 664 558 A1 11/2013
WO WO 2013/155009 10/2013

*Primary Examiner* — Neil N Turk
(74) *Attorney, Agent, or Firm* — Woodard, Emhardt, Moriarty, McNett & Henry LLP

(57) ABSTRACT

Described in one aspect is a multi-cell or multi-chambered container for sealing various materials such as therapeutic or diagnostic agents, animal or human tissue, tissue samples, specimens, blood, genetic material, or any other material. The container includes seals formed by folding the wall of the elongate body transverse to the interior of the elongate body and maintaining the folded wall portions adjacent one another or joining them together. In another aspect, the container disclosed may be made according to a method involving creating multiple seals at various locations along the elongate body thus creating sealed voids or cells between the seals within the elongate body.

10 Claims, 9 Drawing Sheets

(51) Int. Cl.

| | | |
|---|---|---|
| *B31B 70/00* | (2017.01) | |
| *A61J 1/14* | (2006.01) | |
| *A61J 1/10* | (2006.01) | |
| *A61J 1/20* | (2006.01) | |
| *B65B 51/26* | (2006.01) | |
| *B29C 65/00* | (2006.01) | |
| *B29C 65/02* | (2006.01) | |
| *B65D 77/00* | (2006.01) | |
| *B65D 75/58* | (2006.01) | |
| *B29C 65/08* | (2006.01) | |
| *B29C 65/10* | (2006.01) | |
| *B29C 65/14* | (2006.01) | |
| *B29C 65/16* | (2006.01) | |
| *B29C 65/48* | (2006.01) | |
| *B29C 65/04* | (2006.01) | |
| *B29L 31/00* | (2006.01) | |

(52) U.S. Cl.
CPC ............ *B29C 65/10* (2013.01); *B29C 65/14* (2013.01); *B29C 65/16* (2013.01); *B29C 65/48* (2013.01); *B29C 65/4895* (2013.01); *B29C 66/3452* (2013.01); *B29C 66/71* (2013.01); *B29C 66/7212* (2013.01); *B29C 66/8266* (2013.01); *B29C 66/8322* (2013.01); *B29L 2031/7148* (2013.01); *B65D 75/5883* (2013.01)

(56) References Cited

U.S. PATENT DOCUMENTS

| | | | |
|---|---|---|---|
| 3,898,457 | A | 8/1975 | Packard et al. |
| 4,994,056 | A | 2/1991 | Ikeda |
| 5,531,683 | A | 7/1996 | Kriesel et al. |
| 5,890,347 | A | 4/1999 | Giacomelli et al. |
| 6,203,535 | B1* | 3/2001 | Barney .................. A61J 1/10 53/452 |
| 6,209,738 | B1 | 4/2001 | Jansen et al. |
| 6,318,191 | B1 | 11/2001 | Chen |
| 6,875,203 | B1 | 4/2005 | Fowles et al. |
| 8,490,466 | B2 | 7/2013 | Schleifer et al. |
| 2003/0176847 | A1* | 9/2003 | Hurst .................. A61J 1/067 604/415 |
| 2006/0285775 | A1* | 12/2006 | Fukuizumi ............ B31B 19/00 383/37 |
| 2010/0196873 | A1 | 8/2010 | Woods |

\* cited by examiner

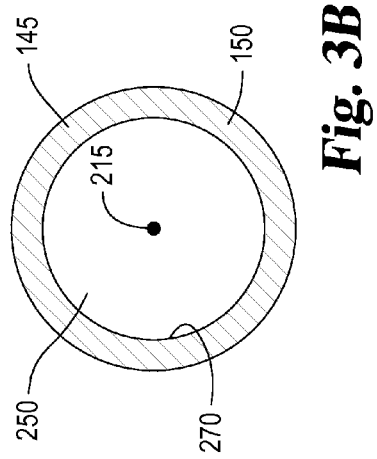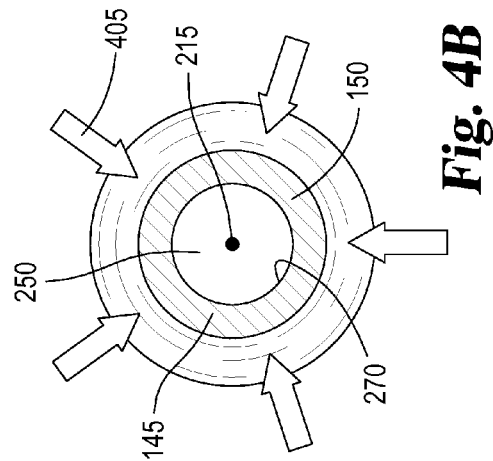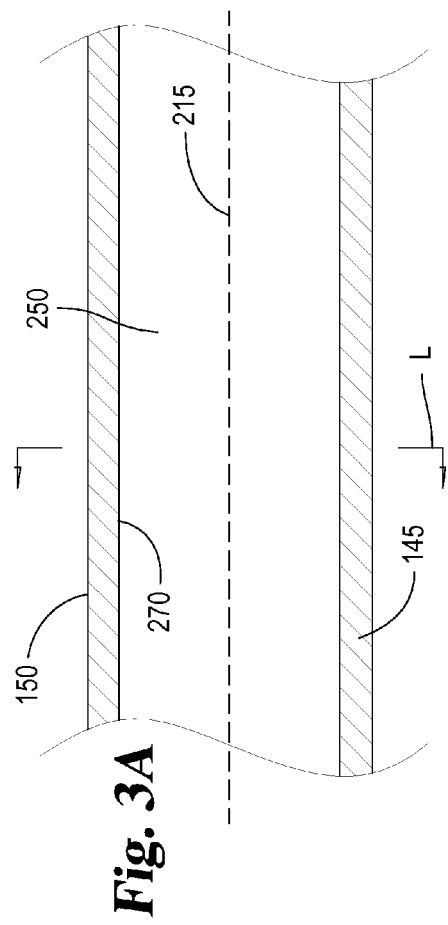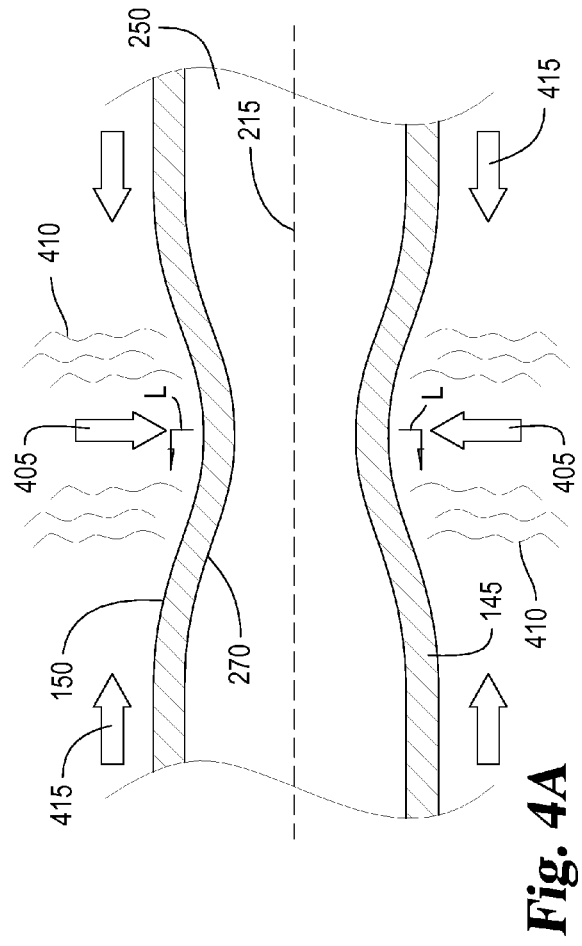

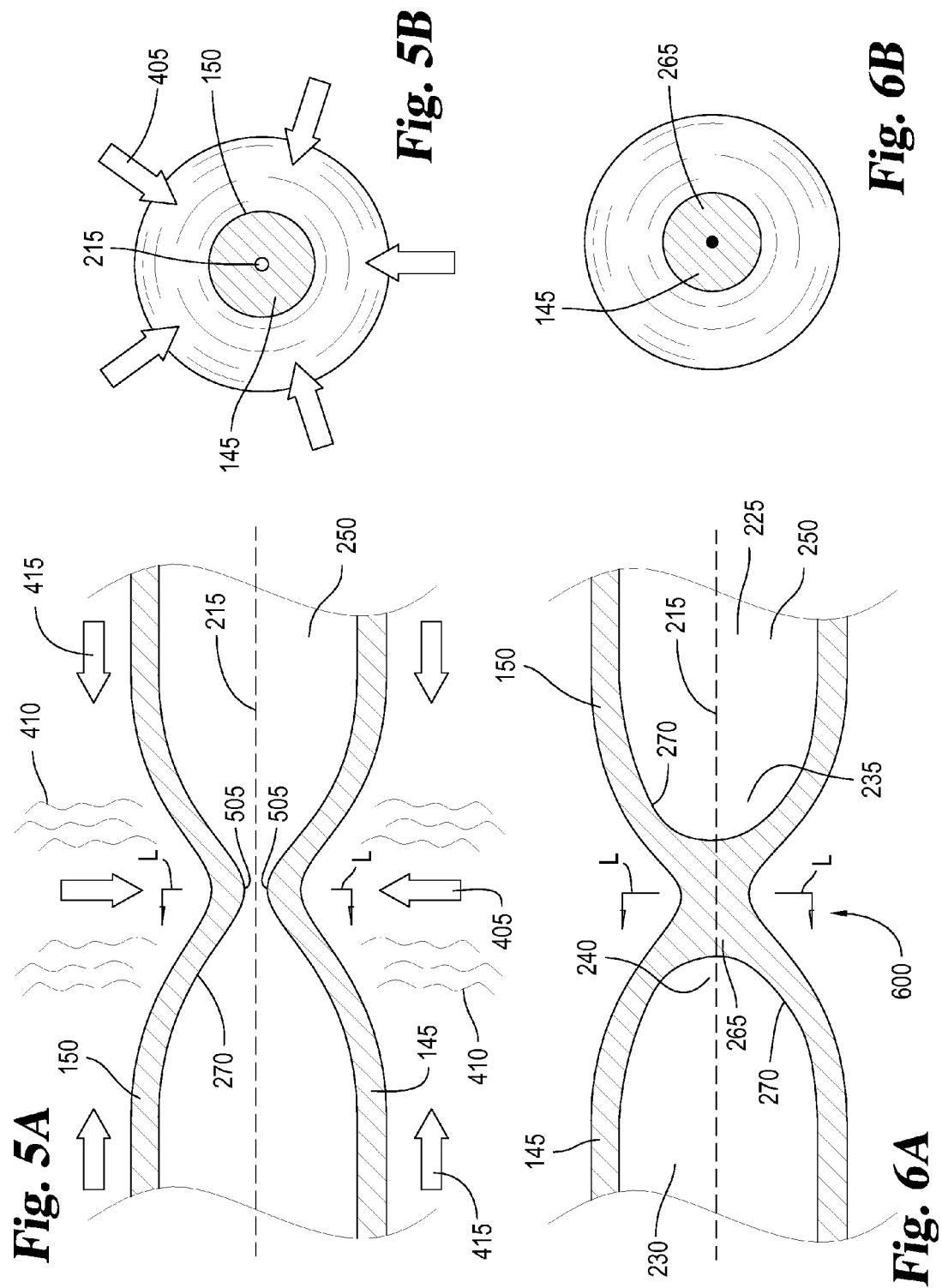

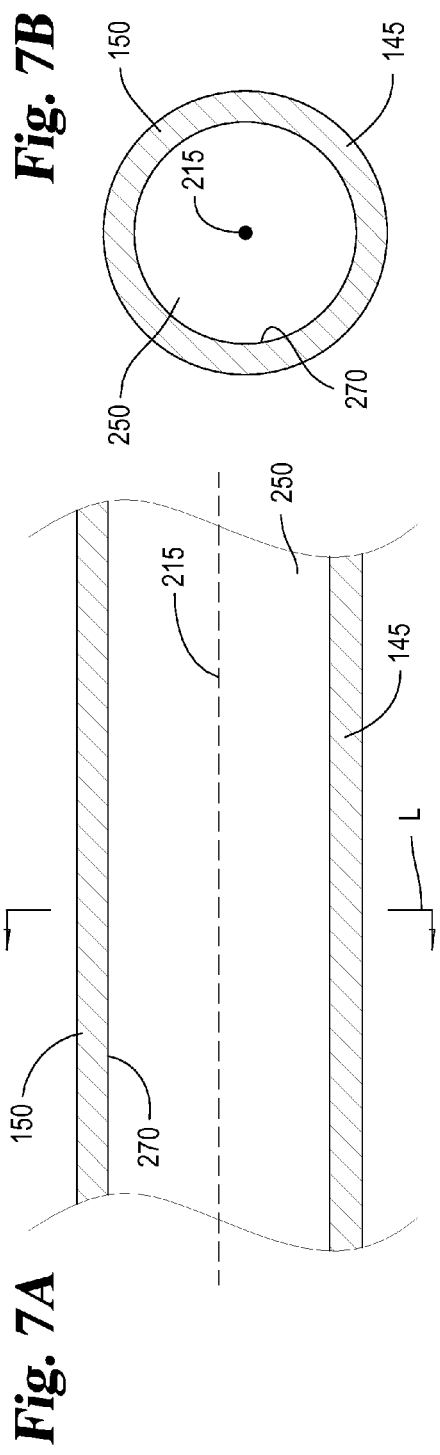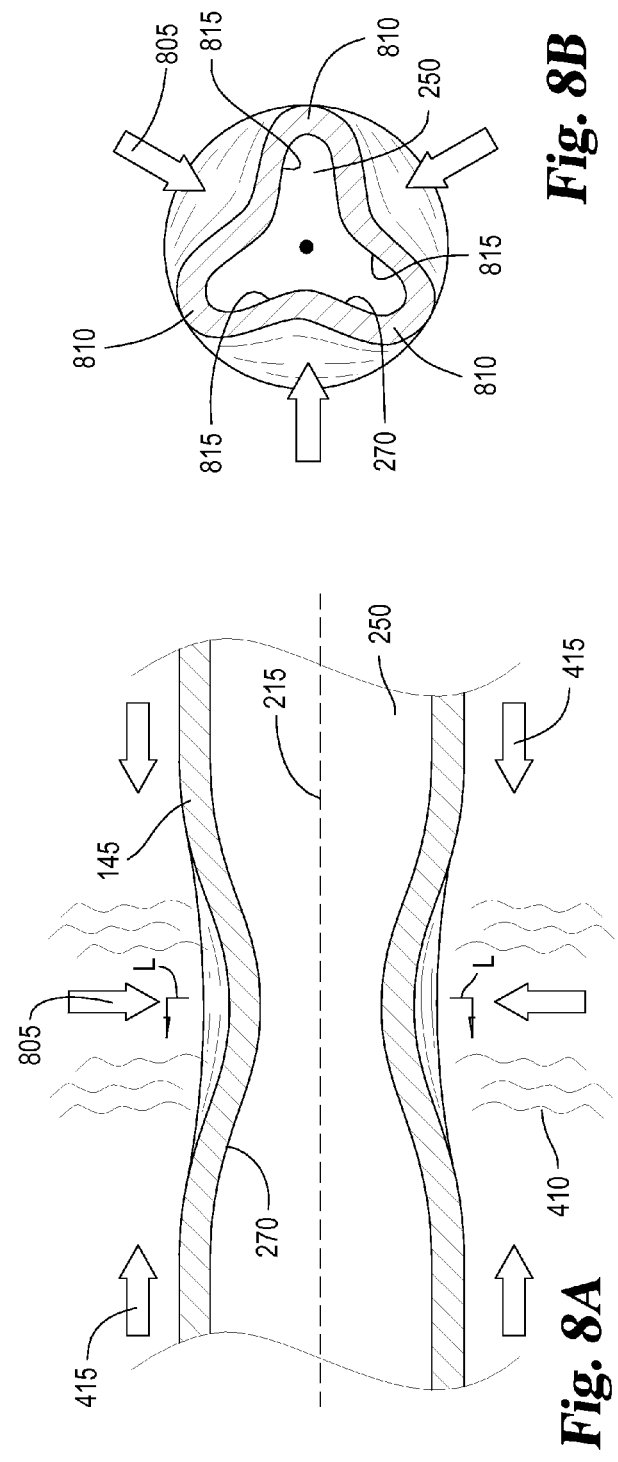

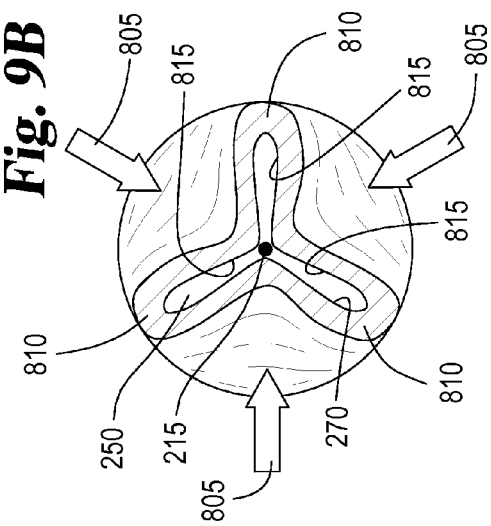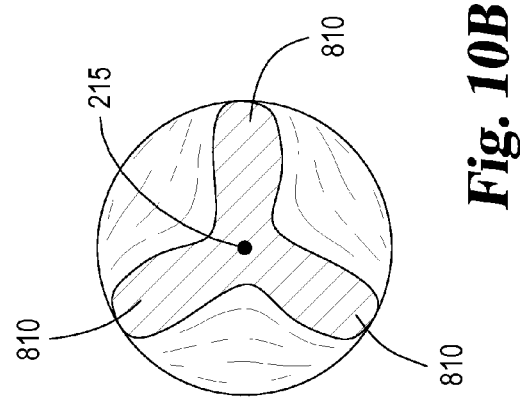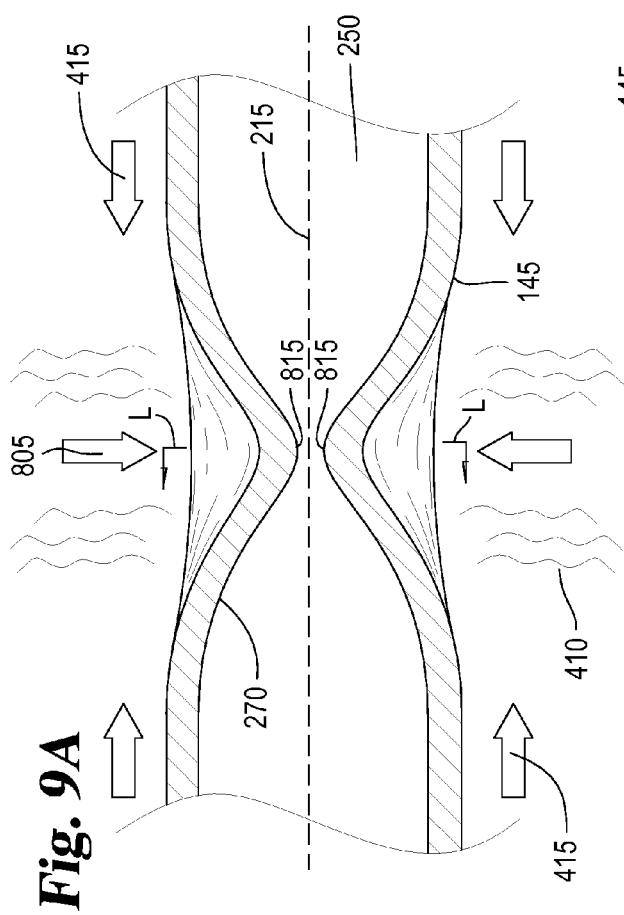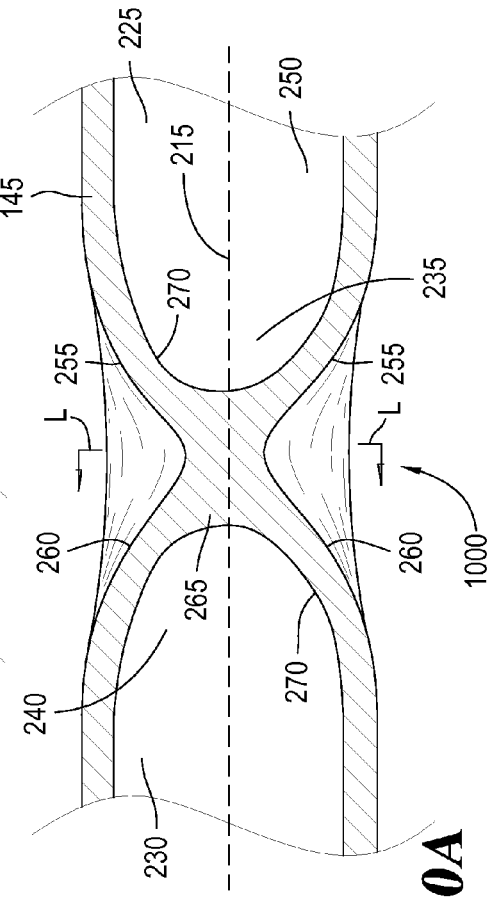

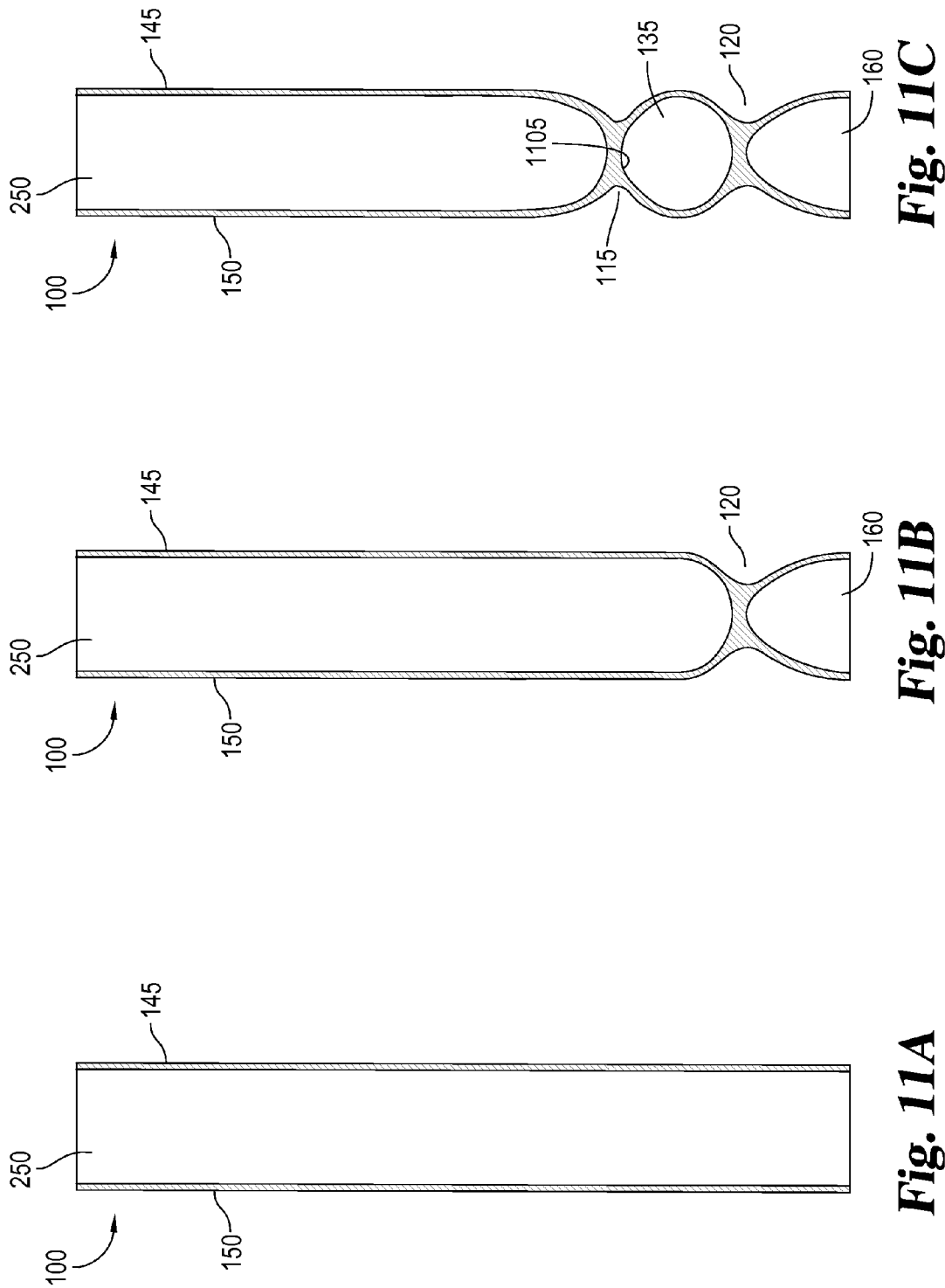

MULTI-CELL SEALED CONTAINER

BACKGROUND

Specimens, samples, and various medicines are sometimes maintained in sealed or sterile containers useful for transporting or storing the contents of the container. Such containers often have a removable cap that may be threaded or press fitted onto or into the container. Such containers are considered "open systems" because the container is initially provided to the technician in a closed state after sterilization. To fill the container, the technician, or filling equipment must first unscrew or otherwise remove the cap, align a dispensing needle or nozzle with the opening, dispense the contents into the container, and replace the cap. Throughout this process, the open configuration of the container presents the potential for contaminants to mix with the contents until the cap is replace and the container is resealed. Withdrawing the contents from a capped container also requires removing the cap and opening the container to the environment that again may not be sterile. Withdrawing the sample may then provide further opportunity for contaminants to mix with the contents.

It is often advantageous to expose the container to extreme cold to preserve the contents inside. However, when submerged in liquid nitrogen for cryopreservation, there is a risk with capped containers that the seal between the cap and the walls of the container may not be maintained and that some liquid nitrogen may leak into the container. Not only does this potentially contaminate the sample, but when the container is warmed to thaw the contents, the rapid expansion of the liquid nitrogen to a gaseous state may cause the container to rupture or explode. Such systems therefore may not be safely immersed into liquid nitrogen and therefore may not be useful for cryogenic preservation.

SUMMARY

Disclosed is a single or multi-cell container that may include an elongate body with an interior lumen such as a conduit or tube. The elongate body may be separated into separate voids, chambers, or cells by any number of seals located along the elongate body. The cells may be hermetically sealed chambers for separately maintaining fluids such as gases or liquids, or for containing solids as well. The chambers may be defined by the wall or walls of the conduit, and by seals at each end of the chamber.

For example, a hermetically sealed void within the elongate body may be defined between a first and second seal where the first and second seals are positioned apart from each other along the elongate body. A second sealed chamber or cell may be defined by the wall of the conduit, the second seal, and a third seal positioned in another location further along the elongate body. Thus any number of chambers or voids may be created accordingly by positioning seals along the conduit. Therapeutic or diagnostic agents may be introduced into any of the voids or cells when a seal has been created at one end of the cell, and before it has been closed at the other end.

The disclosed seals may be formed by folding the wall of the elongate member inwardly across the interior of the elongate body creating a plurality of folds defining corresponding sealing portions of the wall. For example, three folds may be created forming three sealing portions, four folds creating four sealing portions, and so on. Where the wall is compressed inwardly across the interior lumen from many directions (e.g. from 10 directions, or 15 directions, or more), individual folds and sealing portions may become substantially indistinguishable. The folds may thus extend inwardly from three directions, from four directions, or from substantially all directions. Substantially all portions of the inner surface of the interior lumen may be folded toward a central longitudinal axis of the elongate member with many folds and joined together across the interior lumen to form the first seal. Irrespective of the number of folds and corresponding number of sealing portions, the folds may extend transverse to the interior lumen of the elongate body and join to one another to form a seal. In this way, the seal can be made contiguous with the wall of the conduit and may be made partially or entirely of wall material used to create the rest of the container.

The disclosed containers and seals may include any number of chambers or cells defined by corresponding seals, and may include any combination of disclosed features. For example, in any of the disclosed containers, the corresponding sealing portions may be positioned adjacent one another forming a seal. The sealing portions on adjacent inner surfaces of the interior lumen may be close to, or in contact with one another to form the seal. The plurality of sealing portions may be fused together to form a unitary closure or sealing structure across the interior of the elongate tube. Put another way, the sealing portions of the seals in the disclosed container may be fused together to form a unitary structure or closure transverse to the interior lumen. The elongate body may narrow at the location of one or more of the disclosed seals, for example, where the elongate body has been pressed inwardly to join the inside surfaces of the interior lumen together to form the seal. For any of the disclosed containers and seals, the wall of the elongate member may include a needle penetrable material making it possible to access the contents of one or more of the cells or voids using a needle such as a hypodermic needle. Any of the disclosed containers may include a wall material that is a polymeric material like Ethylene-Vinyl Acetate (EVA), or other suitable polymeric material.

Also disclosed is a method of forming a sealed container that includes compressing the wall of an elongate body such as a conduit or tube transverse to the elongate body to form at least three folds. As discussed herein elsewhere, the folds may be transverse to the elongate body from different directions into an interior lumen defined by the elongate body to create a narrowing region in the elongate body. The elongate body may also be compressed longitudinally toward the narrowing region from either side of the narrowing region. The multiple folds may be joined together in the interior lumen to form a first seal, for example, according to the seals described above. A second seal may then be formed along the elongate body creating a chamber or void defined by the interior lumen between the first and second seals and the wall of the conduit or tubing. This chamber may be a hermetically sealed void maintaining any fluid gas or liquid, or any solid that may have been inserted into the chamber after the first seal was made, and before the second seal was made.

The method of forming the container may also include applying heat to the wall of the container as either the first or second seals (or both seals) are formed. The heat may be useful in fusing the sealing portions together into a single unitary structure, whether there are three sealing portions, four sealing portions, or a larger number of sealing portions such as sealing portions extending inwardly from substantially all directions around the perimeter of the elongate body. Sealing portions may extend from all directions where, for example, a force transverse to the elongate body is applied substantially evenly around an outer surface of the elongate body. In this example, the elongate body is constricted, compressed, or "choked off" from all around the perimeter or circumference of the elongate body, and may also be twisted in the process to further aid in folding the interior surfaces inwardly transverse to the elongate body. Any number of seals, such as a second, third, fourth, or more seals may be created using the disclosed method.

Diagnostic or therapeutic agents, human or animal tissue, cells, or fluids, medicines, sample, or any other materials may be added to the cells or voids in the sealed container as it is being made. For example, any of these materials may be added after a first seal is created, and before the second seal is created thus trapping the material inside the container. The container and the contents may then be refrigerated or cryogenically preserved, for example, by total or partial immersion in a liquid nitrogen bath. Such containers may also be packaged and shipped, or placed in storage.

Upon use, the container may be opened without exposing the contents to contaminants by, for example, penetrating the container with a needle, withdrawing the contents, and discarding the container. The container may be penetrated in any suitable location, such as through the seal itself. During construction of the container, additional voids on either end of a void containing the specimen or other material to be preserved may have been created in a sterile (or substantially sterile) environment thus preserving the sterility of the puncture location where a hypodermic needle might be inserted to withdraw the specimen.

For example, a continuous tubing or conduit may be used to create numerous multi-celled sealed containers by sequentially creating seals, filling the resulting voids as desired, and separating the container from the continuous roll upon completion. In a sterile or substantially sterile environment, an elongate member such as a continuous roll of flexible conduit or tubing comprising EVA or some other needle penetrable material may be used to create a first seal at a first location some distance distal to the proximal end of the conduit according to any of the principles or methods and having any of the structures disclosed herein. Then a second seal may be created in a similar manner proximal to the first seal. The second seal may thus maintain the substantially sterile environment inside the cell or void between the first and second seals. This can be advantageous in preserving a substantially sterile puncture site for a needle if the second seal is later punctured in a direction distal to proximal.

The diagnostic or therapeutic agents, human or animal tissue, cells, or fluids, medicines or other contents of the container may then be inserted into the open proximal end of the conduit filling a portion of the remaining interior lumen proximal to the second seal. The second seal thus provides a distal end closure for a chamber which is closed by the second seal at the distal end, and open at the proximal end. A third seal may then be created using procedures and structures disclosed herein that is proximal to the contents in the chamber thus defining another hermetically sealed void between the second and third seals that contains the diagnostic or therapeutic agent. A fourth seal may also be created to maintain the sterile environment for a puncture site on the proximal side of the third seal. Thus the insertion site of a needle penetrating through the third seal from proximal to distal may be kept substantially sterile by the third void created between the third and fourth seals. Lastly, the completed container may be separated from the continuous roll of conduit distal to the first seal and the process may be repeated for another container.

Extracting the contents of this exemplary container later can include cutting away the elongate body between either the first and second seals to expose the second seal, or between the third and fourth seals to expose the third seal. In the case of exposing the second seal, a needle may then be used to penetrate the second seal and withdraw the contents of the chamber between the second and third seals. A similar procedure may be used in puncturing the third seal and withdrawing the contents of the container from the opposite direction as well. In either case, the contents of the container in this example have been kept hermetically sealed, and the puncture sites have been kept as free of contaminants as possible during transportation, handling, and storage of the container.

Additional embodiment summaries can be understood from reference to the claims hereinafter, with it being understood that each claim is considered an embodiment disclosed. Further, still additional embodiments will be apparent to those skilled in the art from the Detailed Description herein.

BRIEF DESCRIPTION OF THE DRAWINGS

FIGS. 3A-6B are cross sectional views illustrating stages in the formation of a seal like the seal shown in FIG. 2A.

FIGS. 7A-10B are cross sectional views illustrating stages in the formation of a seal like the seal shown in FIG. 2B.

FIGS. 11A-11F are cross sectional views illustrating stages in the formation and filling of a multi-cell container like the one shown in FIG. 1.

REFERENCE TO RELATED APPLICATION

Figure 1:
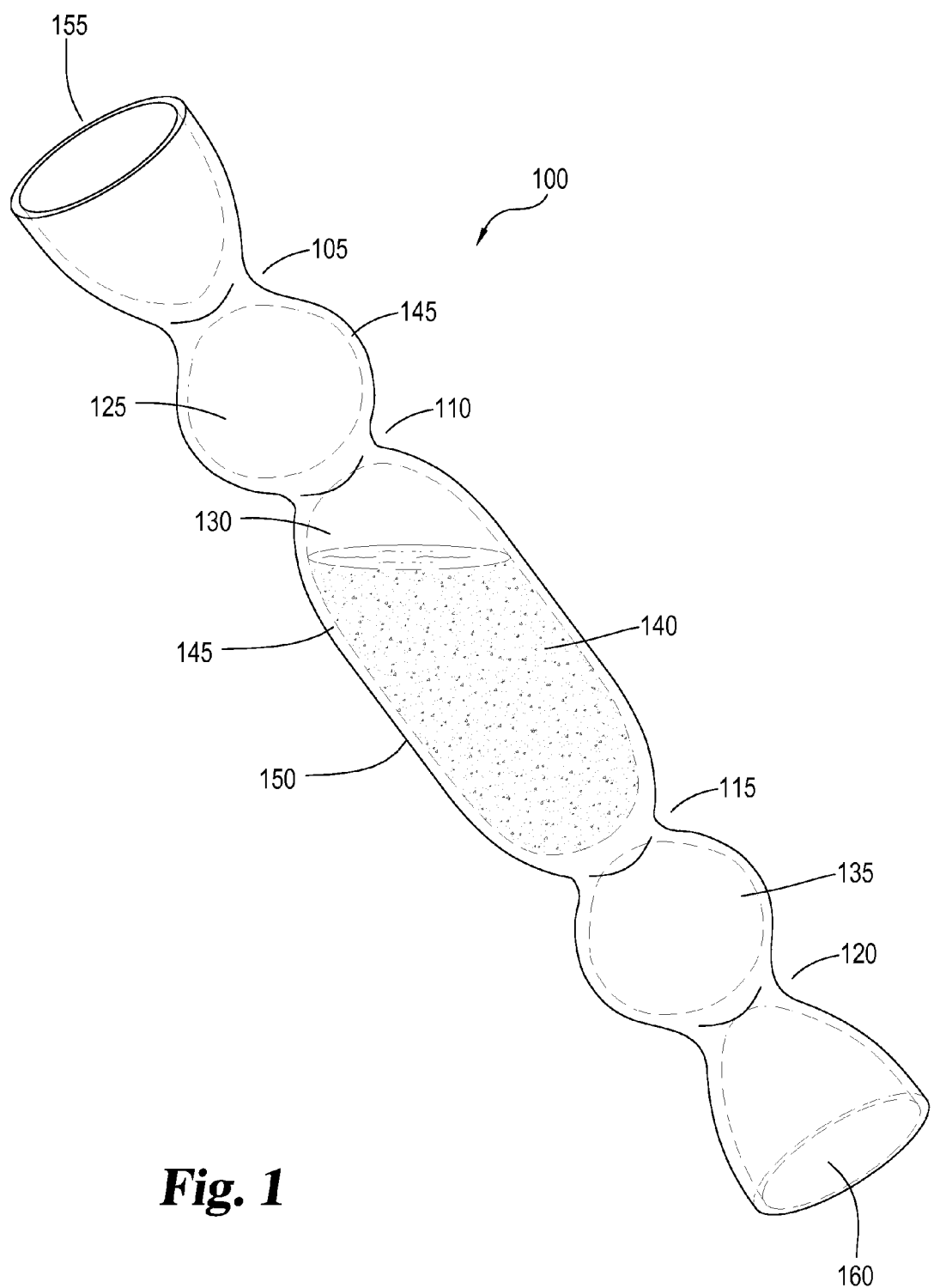
FIG. 1 is a perspective view of one example of a multi-cell container with multiple seals.

The present application claims the benefit of U.S. Provisional Patent Application No. 62/041,820 filed Aug. 26, 2014 which is incorporated herein by reference in its entirety.

DETAILED DESCRIPTION

For the purpose of promoting an understanding of the principles of the invention, reference will now be made to the examples illustrated in the drawings and specific language will be used to describe the same. It will nevertheless be understood that no limitation of the scope of the invention is thereby intended. Any alterations and further modifications in the described examples, and any further applications of the principles of the invention as described herein are contemplated as would normally occur to one skilled in the art to which the invention relates. One or more examples of the invention is shown in great detail, although it will be apparent to those skilled in the relevant art that some features that are not relevant to the present disclosure may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

One example of a container is illustrated in FIG. 1 at 100. An elongate body 150 with a wall or walls 145 has four seals distributed at separate locations longitudinally spaced apart along elongate body 150. A first seal 105 and a second seal 110 in conjunction with wall 145 may define a cell or void 125 in the interior of elongate body 150. Similarly, a second cell or void 130, may be defined by wall 145, a second seal 110, and a third seal 115. A third void 135 may be defined by third seal 115, wall 145, and a fourth seal 120. Additional voids or cells may also be defined in a similar manner along the length of elongate body 150 of container 100 with four, five, six, or more sealed voids like voids 125, 130, and/or 135. Container 100 (or any combination of containers like container 100) may also be formed along an elongate body to define a single void, two voids, five voids, and so forth. Any suitable number of seals defining corresponding voids may be included in a container 100. For example, for any of the examples disclosed herein, container 100 may be repeatedly produced from a single elongate body 150 such as a continuously fed roll of conduit or tubing.

Container 100 may terminate at seals 105 and 120, or may include additional lengths of elongate body 150 defining extensions or additional lengths 155 and 160. Extensions 155 and 160 may extend longitudinally beyond seals 105 and 120 away from voids 125 and 135 respectively. Extensions 155 and 160 are optional elements which may provide additional support and protection for seals 105 and 120, or aid in handling, manufacturing, or storage of container 100.

Seals 105, 110, 115, and 120, as well as other seals described herein may be fluid tight or hermetic seals thus making it possible to hermetically seal voids such as 125, 130, 135 and any other voids that may be created by additional seals formed along elongate body 150. Thus the seals disclosed herein can reduce or eliminate the transfer of fluid or other substances from one void to another. In one example, one of the voids, such as void 130 may contain a specimen, sample, or other substance 140 which may be a fluid such as a gas or a liquid, or it may be a solid as well. For example, container 100 with fluid contents 140 in a liquid state may be placed in a cool environment possibly causing the contents of fluid 140 to condense changing state from a gas or vapor to a liquid phase fluid. Container 100 may also be placed in an environment that is colder still causing the gas or liquid phase fluid contents 140 to change phase to a solid. In another example, Container 100 may be subjected to extremely cold temperatures such as by partially or completely immersing container 100 in a cryogenic freezing environment such as a liquid nitrogen bath which may also cause fluid 140 to change phase to a solid. Contents 140 may be maintained in the solid phase, such as during storage or transportation, before later being thawed to a liquid phase, or vaporized to a gaseous phase within void 130.

FIG. 1 illustrates a substance 140 in void 130, with voids 125 and 135 illustrated as empty. Any of these voids herein disclosed may contain a fluid or other substance as discussed with respect to void 135. Thus container 100 may be used for any suitable arrangement of sealed voids 125, 130, and 135 containing any combination of gases, liquids, or solids, or any other contents.

As shown in FIG. 1, container 100 has a wall 145 which may be formed of any suitable material such as any of various metals, polymeric materials including thermoplastic materials, carbon fiber compounds, and the like, or any combination thereof. Exemplary thermoplastic materials include: polyethylene, polypropylene, polyurethane, and polyvinylchloride. Suitable materials also include needle penetrable materials that allow a needle, blade, or other sharp object to penetrate wall 145 with relative ease to extract contents 140. For example, one such material is Ethylene-Vinyl Acetate (EVA), or other similar material. Wall materials for wall 145 also include needle penetrable materials like EVA which may allow contents 140 of any voids like 125, 130, or 135 to be extracted by puncturing wall 145, or by puncturing a seal like seals 105, 110, 115, or 120 where the seals are formed contiguous with wall 145 and include needle penetrable wall material. The seals disclosed herein such as seals 105, 110, 115, or 120 may be formed entirely of wall material 145 as illustrated below, and they may also comprise wall material along with other sealing devices or structures made of other materials such as rubber, other polymeric materials, and the like.

Various configurations of wall 145 are also envisioned. For example, wall 145 may be a single wall extending around the perimeter of elongate body 150. Wall 145 may be substantially circular, ovular, or may be some other curvilinear shape depending on the cross-sectional shape of elongate body 150. In another example, wall 145 may be composed of several segments or sides with corners or vertices, such as where elongate body 150 has a square, rectangular, hexagonal, or other multi-sided polygonal cross-sectional shape. Where other cross-sectional shapes are involved, the perimeter of wall 145 may be considered a single wall made up of multiple sides or segments with a perimeter of elongate body 150 that includes the outer surface of the various segments. Therefore the use of the term "wall" with respect to the disclosed examples and embodiments includes a single wall, a single wall with any number of sides, or a wall comprising multiple wall segments.

Figure 2A:
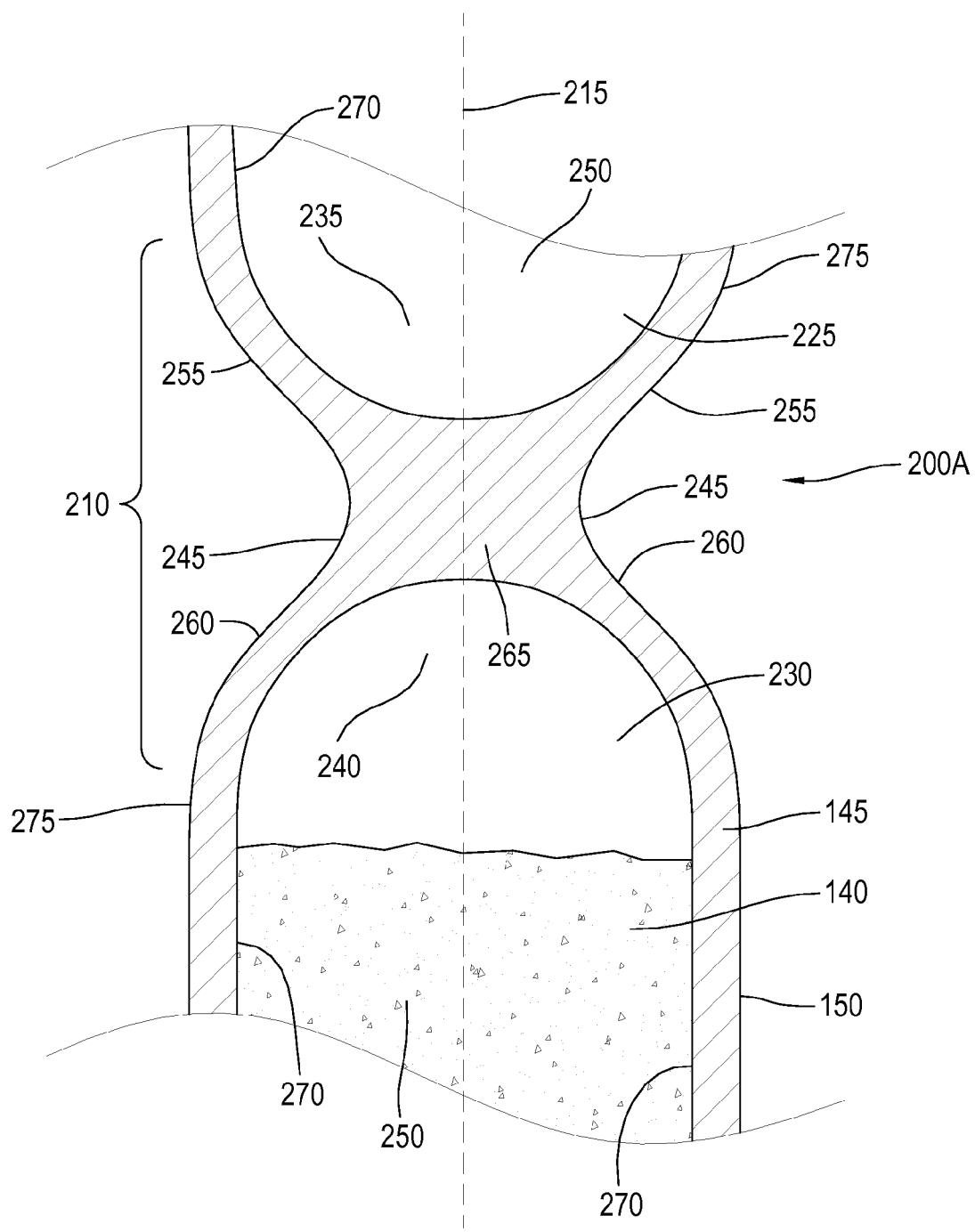
FIG. 2A is a cross sectional view of one example of a seal like the seals shown in FIG. 1.
Figure 2B:
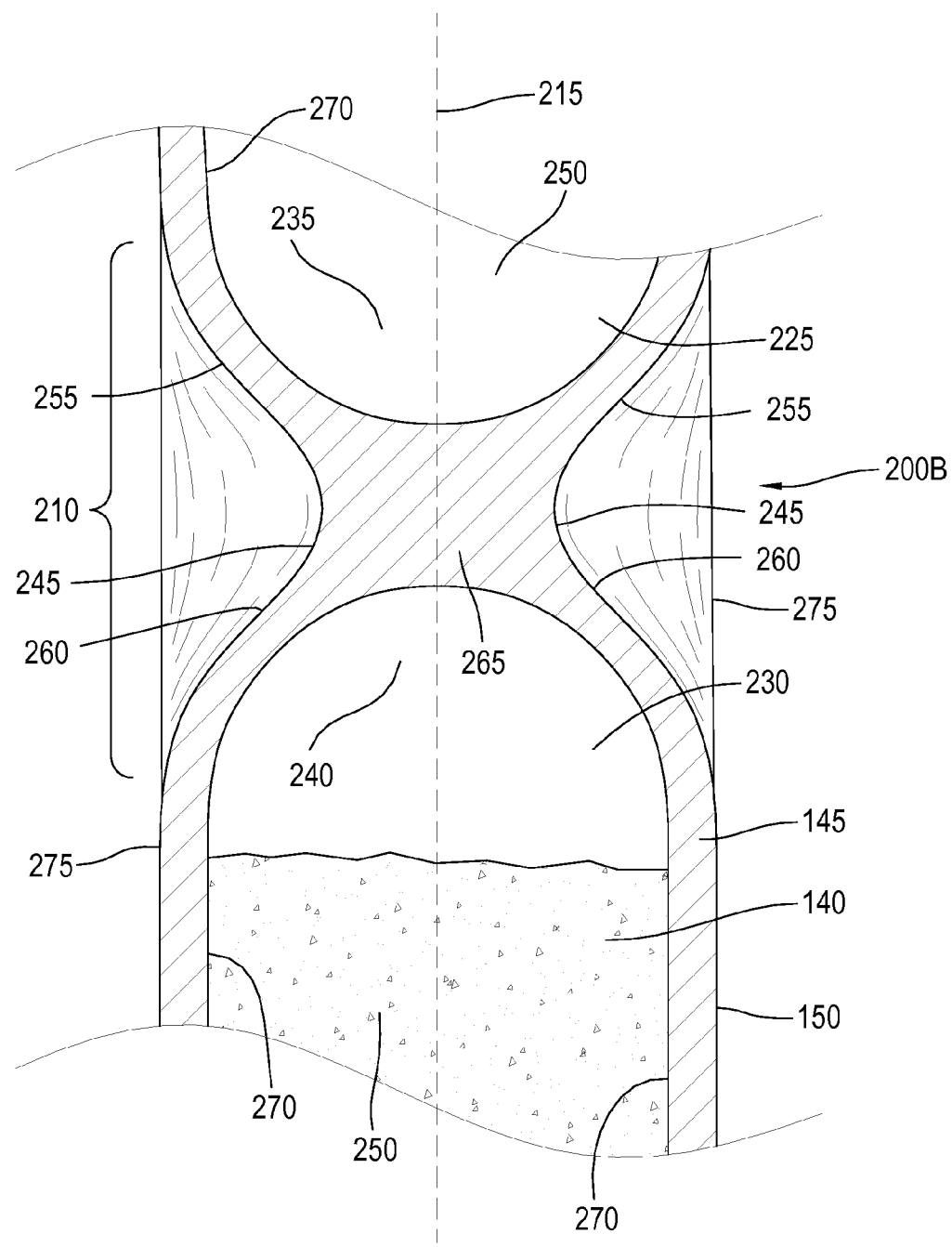
FIG. 2B is a cross sectional view of another example of a seal like the seals shown in FIG. 1.

Any of the seals discussed herein, such as seals 105, 110, 115, and 120, may be formed as illustrated in FIG. 2A or 2B. FIGS. 2A and 2B provide examples of various structural elements which can optionally appear in any suitable combination for the seals, containers, voids, or other structures disclosed herein. Other structural arrangements may be included as well in the disclosed seals or combinations of seals and voids in a container as a container of the present disclosure may be formed by any suitable configuration of an elongate body like elongate body 150.

Exemplary seals 200A and 200B are illustrated in FIGS. 2A and 2B respectively where an interior lumen 250 of elongate body 150 may be divided or segmented by a transverse closure or sealing portion 265 that may extend in a direction across elongate body 150. Closure 265 may thus form one end of one cell or void on one side of the closure, and a second end of a second separate void on the opposite side of the closure. The closure 265 may extend across lumen 250 to intersect a longitudinal axis 215 defined by elongate body 150. As illustrated in FIGS. 2A and 2B, sealing portion or closure 265 may also be formed contiguous with wall 145. In this way, internal chambers, cells, or voids 225 and 230 of interior lumen 250 may be sealed or hermetically sealed to reduce or eliminate the transfer of fluids through between the two chambers.

Sealing portion 265 can extend inwardly from all around the perimeter of elongate body 150 in a direction across interior lumen 250. This sealing portion may be formed by folds or portions of wall 145 folded inwardly to extend across lumen 250. Closure 265 may be formed by two folds, three folds, or four or more folds compressing wall 145 inwardly toward longitudinal axis 215. In another example illustrated in FIG. 2A, many folds press wall 145 inwardly from substantially all directions around the inside surface 270 of lumen 250. In this example, inside surfaces 270 of lumen 250 are folded together as sealing surfaces joined together to form closure 265.

The inward folding of wall 145 can create a concave region 245 along outside surface 275 corresponding with the narrowing of elongate body 150 at sealing portion 265. The concave region 245 creates shoulders or shoulder regions 255 and 260. The corresponding concave region 245 and shoulder regions 255 and 260 define a narrowing region 210 in elongate body 150 as wall 145 is maintained or joined internally across the longitudinal axis 215 and extends inwardly from multiple directions around the perimeter of elongate body 150. The inward fold 245 may also define internal concave regions 235 and 240. These regions may, for example, be formed on opposite sides of seals 200A or 200B and may also define the ends of opposing voids 225 and 230 where closure 265 separates lumen 250 to create the ends of voids 225 and 230.

FIG. 2B differs somewhat from FIG. 2A in that it illustrates an example of the structures discussed in FIG. 2A where the closure 265 has been formed by folding or compressing wall 145 in a direction toward longitudinal axis 215 across lumen 250 from three or four locations along the perimeter of inside surface 270. In this example, concave region 245 may be a partial indention in the side of elongate body 250, and shoulders 255 and 260 may therefore extend only part-way along the outside surface 275 of elongate body 150 rather than around the entire perimeter. Additional detail in the formation of the example illustrated in FIG. 2B is further illustrated in FIGS. 7A-10B and discussed below.

Some examples of modifying elongate body 150 to form a seal according to the seals described and illustrated herein are illustrated in FIGS. 3A-10B. Any suitable technique for creating seals in an elongate body like body 150 is considered as these illustrations are not restrictive in nature. For example, FIGS. 3A-6B illustrate a process beginning at FIG. 3A useful for creating a seal like seal 200A where interior surface 270 of elongate body 150 defines interior lumen 250 as previously discussed. FIG. 3B is a cross section of elongate body 150 taken at section line L and viewed in the direction of the arrows as shown.

FIG. 4A illustrates a later stage of the process started in FIG. 3A where a narrowing region 210 is formed by the application of an inwardly directed compression force 405 compelling inner surfaces 270 of wall 145 toward one another across interior lumen 250. Compression forces 405 may be applied substantially perpendicularly to elongate body 150 in a direction toward longitudinal axis 215 across lumen 250 as illustrated, or from other directions as well. Forces 405 may also be applied in conjunction with, or separately from, a separate longitudinal compression force 415 applied substantially along elongate body 150 substantially parallel to the longitudinal axis 215 toward the seal. Forces 405 and 415 may be applied at about the same time, or separately at different times as a seal like seal 200A is formed.

Closure 265 may also be formed by applying heat 410 as well as compression forces 405 and 415. Heat 410 may be optionally applied to wall 145 for the purpose of adhering, bonding, or fusing wall material together to form closure 265. As illustrated in FIG. 4B, forces 405 may be applied as shown from numerous directions simultaneously, from different directions in a predetermined sequence, or in any combination thereof. FIG. 4B illustrates forces 405 compressing wall 145 from five directions, but this is illustrative only as wall 145 may be compressed substantially evenly from all areas around the perimeter of elongate body 150 at substantially the same time.

Forces 405 and 415 may be useful to bring additional wall material from wall 145 into the narrowing region 210 for the purpose of creating closure 265. For example, in the case where heat 410 is applied, wall material in wall 145 may soften in the area of narrowing region 210 allowing additional wall material to flow into the area of narrowing region 210. This additional wall material may be supplied by the surrounding wall 145 as it is compressed toward narrowing region 210 by compression forces 415. The additional material may be useful in creating seal like seal 200A from wall material and contiguous with wall 145 as illustrated in FIGS. 2A and 2B.

Compression forces 410 may also be applied along with a twisting force to elongate body 150 around longitudinal axis 215 focusing the torque on elongate body 150 on narrowing region 210 where closure 265 is to form. Also, a second twisting force in an opposite direction from the first force may be optionally applied on the opposite side of narrowing region 210 as well to further aid in the compression of wall 145. Heat 405 may be applied as the twisting forces are applied as well, and the optional compression by forces 415 may also be applied as discussed above. The combination of heat 410, compression 415, and twisting force applied to elongate body 150 can be used together to create closure 265 at narrowing region 210.

In another example, a compression device contacting some or all of outside surface 275 may apply compression forces 405 substantially evenly from substantially all directions with or without twisting elongate body 150. Similarly, as will be discussed below, the compression device may compress outside surface 275 inwardly by forces 405 from three locations around the perimeter of elongate body 150, or from four locations, or more resulting in a seal similar to seal 200A appearing in FIG. 2A. In each of these examples, interior lumen 250 is narrowed as forces 405 are applied.

FIGS. 5A and 5B further illustrate the creation of a seal like seal 200A with FIG. 5B illustrating a corresponding cross-sectional view of the resulting structure at section line L from FIG. 5A. In FIGS. 5A and 5B, lumen 250 is substantially narrowed and nearly closed off as wall 145 is folded inwardly in a direction across lumen 250 from substantially all directions at about the same time. Heat 405 may be further applied to elongate body 150, may be newly applied at this point in the procedure if it was not previously applied, or alternately, heat 405 may be optionally withdrawn at this stage. Compression forces 410 and longitudinal compression forces 415 may similarly be applied or withdrawn as well. The combination of forces 405 and 415 with heat 410 can result in sealing portions 505 of wall 145 joining together to close interior lumen 250 as wall 145 is folded inwardly from substantially all directions around the perimeter of elongate body 150. In this way, chambers 225 and 230 of interior lumen 250 may be defined by hermetically sealing closure 265 between them to reduce or eliminate the transfer of fluids between the two voids or cells.

Sealing portions 505 of interior surfaces 270 may be joined together to form the closure 265. Sealing portions 505 may be joined together by any suitable technique such as by melding or fusing wall 145 together to form closure 265. Other exemplary techniques for joining sealing portions 505 together include ultrasonic welding, heat, solvents, or other similar agents or techniques. In these examples, sealing portions 505 of interior surfaces 270 may no longer be separately identifiable in the finished closure 265 as wall material from sealing portions 505 may be blended to form a single unitary structure 265 contiguous with wall 145. In another example, sealing portions 505 may be adhered together with any suitable adhesive, a process which can join sealing portions 505 while maintaining the separate structural properties of wall 145 intact (such as interior surfaces 270) that define sealing portions 505. In this case, interior sealing portion surfaces 270 may continue to be separate identifiable structures while remaining joined together in a sealing relationship to hermetically seal lumen 250 as discussed herein elsewhere.

As illustrated in FIG. 2A, and further in FIGS. 3A-6B, wall 145 may be folded inwardly toward the longitudinal axis 215 of elongate body 150. The inward folding may be accomplished by creating many folds in wall 145 each folding the wall inwardly across lumen 250 and together defining sealing portions 505. The aggregate of folded wall portions inwardly extending across lumen 250 from substantially all directions around the perimeter of elongate body 150 can create shoulders 255 and 260. In this respect, FIG. 2A and FIGS. 3A-6B may be thought of as having an aggregate of numerous folds defining corresponding sealing portions 505 folding inwardly from substantially all directions around the perimeter of elongate body 150. The result in FIGS. 6A and 6B is a seal 600 like seal 200A forming closure 265 across lumen 250. Voids or cells 230 and 225 are thus separately defined as discussed above.

Another example of a series of actions that may be taken to form a seal like seal 200B is shown in FIGS. 7A-10B. Like the previous example in FIGS. 3A-6B, lumen 250 is illustrated in FIGS. 7A-10B defined by wall 145 having an interior surface 270. As shown in FIGS. 8A and 8B, wall 145 may be compressed by compression forces 805 from three different directions creating a plurality of folds 810 in the wall 145. Folds 810 define corresponding sealing portions 815 which can be joined together to form a seal like seal 200B. In other examples, compression forces 805 may also be applied from four separate directions, from five directions, or possibly only from two directions. As illustrated in FIG. 8A-10B, forces 805 may be applied substantially perpendicularly to elongate body 150 from locations around the perimeter of elongate body 150 folding wall 145 inward across lumen 250 toward longitudinal axis 215. Sealing portion 815 may in this way be joined together to close off and seal interior lumen 250. Heat 410 may also be applied as discussed previously to wall 145 at the location where seal 200 is to be formed As illustrated in FIGS. 9A and 9B, folds 810 may be further defined by continuing to inwardly urge sealing portion 815 in a direction across interior lumen 250 to an extent that interior lumen 250 is substantially or completely closed. Sealing portions 815 may be positioned adjacent one another, or in direct contact with one another across interior lumen 250 as a result of continued compression by forces 805 and optionally by longitudinal compression forces 415 along elongate member 150 as well. Where heat 805 is applied or continues to be applied, sealing portions 815 of wall 145 may be joined together by melting some or all of sealing portions 815 together. Other methods of joining the sealing portions 815 may be used as discussed herein such as by the use of solvents, ultrasonic welding, and the like.

In FIGS. 10A and 10B, a completed seal 1000 similar to seal 200B is illustrated with a plurality of folds 810 (in this example three folds) joined together forming a first chamber 230 within lumen 250 on a first side of seal like seal 200B, and a second chamber 225 in lumen 250 on a second side of seal 200. In this example, as illustrated in FIGS. 2A and 2B, shoulders 255 and 260 may be formed along concave regions where compression forces 805 were applied to narrow wall 145 creating the partial or complete closure 265. In this way, chambers 225 and 230 of interior lumen 250 may be sealed or hermetically sealed to reduce or eliminate the transfer of material between the two chambers.

Figure 11D:
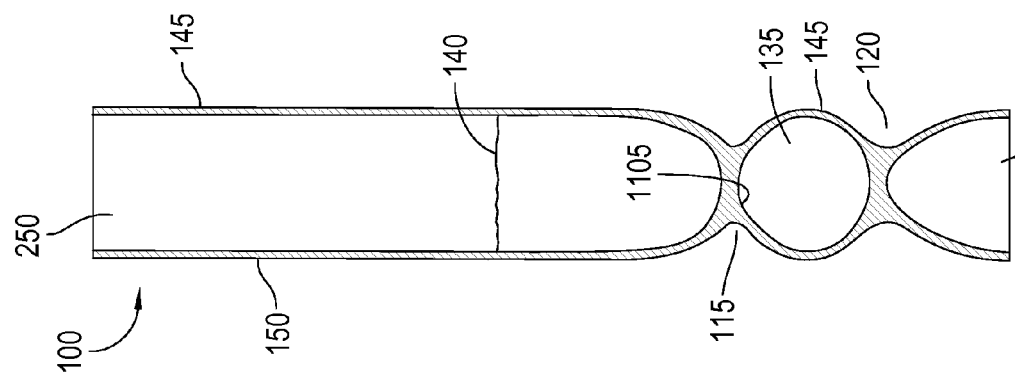

Illustrated in FIGS. 11A-11F are cross-sections of a container 100 at various stages of production. FIGS. 11A-11F illustrate one example of how an elongate body such as a continuous tube or flexible tubing may be used to form containers as herein disclosed including seals defining sealed voids or cells which may or may not be filled with liquids, vapors, gases, solids, and the like as disclosed herein elsewhere. In FIG. 11A, elongate body 150 has a wall 145 defining an interior lumen 250 as previously discussed. A seal 120 may be first created according to any suitable method, including the methods disclosed herein. As illustrated, wall 145 is compressed and folded inward across lumen 250 creating a narrowing region with many folds from substantially all directions at the location of seal 120 as illustrated in FIGS. 2A, and 3A-6B and discussed above. However, seal 120, like any of the seals discussed herein, may be constructed in other ways, such as according to the example shown in FIGS. 2B, and 7A-10B where three folds are pressed across lumen 250 from three separate directions and joined to form seal 120. As discussed above, the elongate body 150 may be compressed longitudinally toward the narrowing region from either side, and heat may be applied as well to create seal 120 as discussed in detail above. An extension 160 may be maintained as previously discussed, for example, for structural support or protection of seal 120.

In FIG. 11C, another seal 115 is created by any means disclosed herein, similar to seal 120. Seal 115 may be formed as illustrated so as to define void 135 that is hermetically sealed from the remainder of lumen 250. In one example, the void 135 may be formed in a sterile environment such that seal 115 is sterile when formed and maintained in a sterile environment during storage and handling thereby allowing the inner surfaces 1105 of void 135 to remain sterile until void 135 is opened, for example, when container 100 is later emptied.

The process is further illustrated in FIG. 11D where a specimen, sample, or other substance 140 may be introduced into lumen 250. As discussed herein elsewhere, the substance may be a specimen such as a biological agent containing human cells, growth factors, human or animal genes or genetic material, blood or other bodily fluids, drugs or drug components, therapeutic or diagnostic agent, and the like. Contents 140 may be introduced into lumen 250 as a liquid, solid, or gas.

Figure 11E:
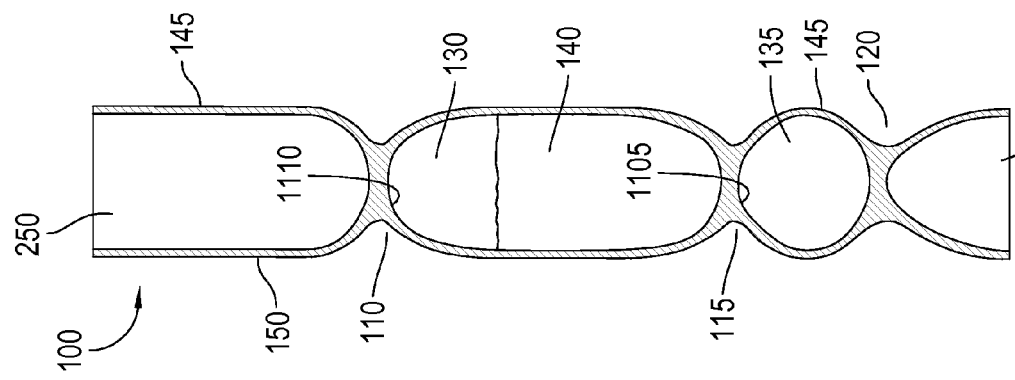

In FIG. 11E, an additional seal 110 is formed, also by any means herein disclosed, similar to seals 115 and 120. In forming seal 110, void or cell 130 is formed as seal 110 closes off void 130 from interior lumen 250. Seal 110 may hermetically seal void 130 reducing or eliminating the transfer of material between void 130 and lumen 250. As with seal 115, where container 100 is formed in a substantially sterile environment, the inside surfaces 1110 of seal 115 may be maintained substantially sterile until void 130 is opened or punctured to withdraw the contents 140.

Figure 11F:
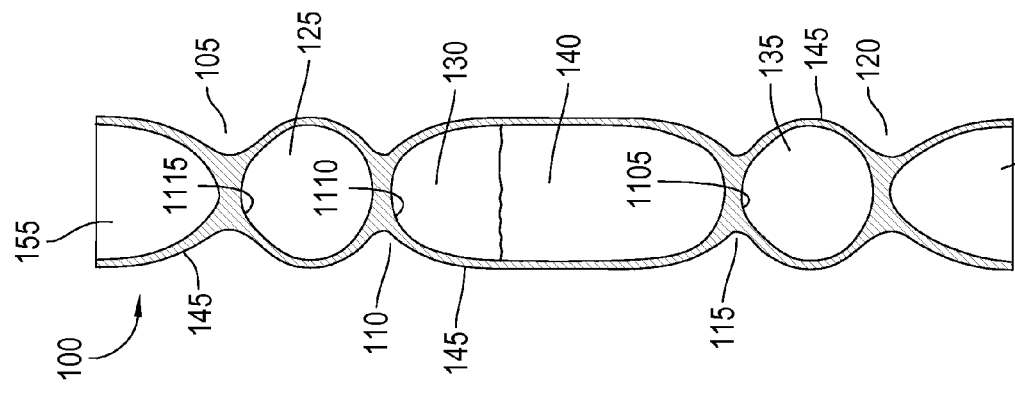

In FIG. 11F, a seal 105 is formed like seals 120, 115, and 110 according to any of the seals disclosed herein, thus creating a void 125 like void 135. As with void 135, where container 100 is formed in a substantially sterile environment, internal surfaces 1115 of void 125 may remain substantially sterile protecting seal 110 during transport, storage, and containment until void 125 is opened.

As shown in FIGS. 11A-11F, container 100 can be created starting with an elongate body 150 that is part of a longer conduit or tube. The conduit may be, for example, be a continuous length of flexible tubing, such as a large roll of tubing formed from a polymeric material like Ethylene-Vinyl Acetate (EVA) or another material with similar physical and chemical properties. Elongate 150 may be maintained as part a this longer length of tubing as the actions illustrated in FIGS. 11A-11F are performed. The longer length of tubing may be, for example, a roll of tubing greater than a hundred times longer, or greater than five hundred times longer than container 100.

The seals disclosed herein may be created along the tubing at various points by squeezing, crimping, or otherwise compressing the wall of the tubing at the location where a seal is to be made, and then bonding the internal sealing surfaces of the tube walls together by any suitable means such as by heat, adhesives, solvents, and the like. Seal 120 can be formed first, followed by seal 115 thereby creating a void 135. The specimen or other contents of the container may be introduced into the open void 130, and then void 130 may be sealed by the creation of another seal 110. Lastly, a seal 105 may be formed enclosing a void 125. During the process of filling and sealing the contents 140, container 100 may be maintained in a substantially sterile environment. Thus the contents 140, as well as the inside surfaces 1105, 1110, and 1115 can also be substantially sterile. Container 100 may then be separated from the longer length of tube by, for example, cutting the tubing near seal 120 leaving extension 160 if necessary. Container 100 may then be, stored, transported, and the like until the contents 140 are withdrawn.

The contents 140 may be withdraw by any suitable means and can include puncturing or otherwise opening wall 145 allowing the contents 140 to escape or be removed. For example, seal 105 and any additional length 155 of elongate body 150 may be removed, and the contents 140 of void 130 removed by puncturing seal 110 with a needle where seal 110 is formed from a needle penetrable material such as EVA for example. By first removing seal 105 and opening void 125, the inner surfaces 1115 of void 125 which may be substantially sterile are exposed to the penetrating needle rather than the other surfaces outside of void 125 which may not be sterile. In this way, voids 125 and 135 may protect the surfaces of seals 115 and 110 opposite void 130 from contamination during transportation, handling, and storage of container 100.

As discussed herein, in certain embodiments the sealing portions of the present invention may be formed using heat. It will be understood that any suitable technique for applying heat known to one skilled in the art may be utilized. In certain embodiments, heat may be directly applied using a heating element, for example a heated iron or bar. In some forms, the heating element is continuously heated. In some forms the heating element comprises an impulse sealer. In other embodiments, heat may be applied using: a laser, infrared radiation, hot gas, ultrasound energy, and/or radiofrequency (RF) energy.

While the invention has been illustrated and described in detail in the drawings and foregoing description, the same is to be considered as illustrative and not restrictive in character, it being understood that only one example may be shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A container, comprising:
    an elongate body with a first, second, and third seal at three separate locations respectively along the elongate body defining a first hermetically sealed void within the elongate body between the first and second seals, and a second hermetically sealed void within the elongate body between the second and third seals;
    wherein at least one of the first or second hermetically sealed voids contains a therapeutic or diagnostic agent;
    wherein the elongate body has a wall defining an interior lumen that has an inner surface;
    wherein the first seal includes a plurality of folds in the wall defining corresponding sealing portions of the wall;
    wherein the sealing portions extend transverse to the interior lumen; and
    wherein the sealing portions are joined to one another to form the first seal, and wherein the first seal, the second seal, and/or the third seal each includes at least three folds defining at least three sealing portions per seal, the sealing portions extending transverse to the interior lumen in different directions, and wherein the sealing portions are on the inner surface of the interior lumen.

2. The container of claim 1, wherein an interior width of the interior lumen at a location adjacent the first, second, or third seal is narrower than the interior width at a location other than adjacent the first, second, and third seal locations.

3. The container of claim 1, wherein the wall of the elongate member includes a thermoplastic polymeric material.

4. The container of claim 1, further comprising:
    a fourth seal at a fourth separate locations along the elongate body defining a third hermetically sealed void within the elongate body between the third and fourth seals;
    wherein the second hermetically sealed void contains a therapeutic or diagnostic agent;
    wherein the first and third hermetically sealed voids do not contain a therapeutic or diagnostic agent; and
    wherein the fourth seal includes at least three folds in the wall defining at least three sealing portions extending transverse to the interior lumen in different directions, and wherein the at least three sealing portions of the fourth seal are fused together to form a unitary structure.

5. The container of claim 1, wherein the therapeutic or diagnostic agent includes cells.

6. The container of claim 3, wherein the thermoplastic polymeric material is Ethylene-Vinyl Acetate (EVA).

7. The container of claim 1, wherein the sealing portions of the wall are contiguous with the wall.

8. A container, comprising:
an elongate body with a first, second, and third seal at three separate locations respectively along the elongate body defining a first hermetically sealed void within the elongate body between the first and second seals, and a second hermetically sealed void within the elongate body between the second and third seals;
wherein the first hermetically sealed void maintains a sterile puncture site through the second seal into the second hermetically sealed void;
wherein the second hermetically sealed void contains a biological material comprising cells;
wherein the elongate body has a wall defining an interior lumen that has an inner surface;
wherein the first seal includes a plurality of folds in the wall defining corresponding sealing portions of the wall;
wherein the sealing portions extend transverse to the interior lumen;
wherein the sealing portions are joined to one another to form the first seal; and a fourth seal at a fourth separate location along the elongate body defining a third hermetically sealed void within the elongate body between the third and fourth seals;
wherein the third hermetically sealed void maintains a sterile puncture site through the third seal into the second hermetically sealed void and does not contain a therapeutic or diagnostic agent; and
wherein the fourth seal includes at least three folds in the wall defining at least three sealing portions extending transverse to the interior lumen in different directions, and wherein the at least three sealing portions of the fourth seal are fused together to form a unitary structure.

9. The container of claim 8, wherein the wall of the elongate member includes a thermoplastic polymeric material.

10. The container of claim 8, wherein the sealing portions of the wall are contiguous with the wall.

* * * * *